(12) United States Patent
Cheng et al.

(10) Patent No.: US 8,161,182 B1
(45) Date of Patent: Apr. 17, 2012

(54) MANAGING NETWORK CONGESTION USING DYNAMICALLY ADVERTISED CONGESTION STATUS

(75) Inventors: Dean Cheng, Fremont, CA (US); Snehal Karia, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 1634 days.

(21) Appl. No.: 09/491,991

(22) Filed: Jan. 26, 2000

(51) Int. Cl.
*G06F 15/16* (2006.01)
*G06F 15/173* (2006.01)
*G01R 31/08* (2006.01)

(52) U.S. Cl. ........ 709/235; 709/239; 370/235; 370/236; 370/237

(58) Field of Classification Search .................. 709/235, 709/239; 370/235, 236, 237, 230, 238.1
See application file for complete search history.

(56) References Cited

U.S. PATENT DOCUMENTS

| | | | |
|---|---|---|---|
| 4,475,192 A | 10/1984 | Fernow et al. | |
| 4,626,624 A | 12/1986 | Daisenberger | |
| 4,679,190 A | 7/1987 | Dias et al. | |
| 4,800,488 A | 1/1989 | Agrawal et al. | |
| 5,067,074 A | 11/1991 | Farel et al. | |
| 5,090,011 A * | 2/1992 | Fukuta et al. | 370/230 |
| 5,119,367 A | 6/1992 | Kawakatsu et al. | |
| 5,128,932 A * | 7/1992 | Li | 370/236 |
| 5,130,978 A | 7/1992 | Mobasser | |
| 5,140,584 A | 8/1992 | Suzuki | |
| 5,267,232 A | 11/1993 | Katsube et al. | |
| 5,295,183 A | 3/1994 | Langlois et al. | |
| 5,313,454 A | 5/1994 | Bustini et al. | |
| 5,359,592 A | 10/1994 | Corbalis et al. | |
| 5,377,327 A | 12/1994 | Jain et al. | |
| 5,473,604 A | 12/1995 | Lorenz et al. | |
| 5,479,402 A | 12/1995 | Hata et al. | |
| 5,548,533 A * | 8/1996 | Gao et al. | 709/235 |
| 5,548,578 A | 8/1996 | Matsune et al. | |
| 5,590,118 A | 12/1996 | Nederlof | |
| 5,600,798 A * | 2/1997 | Cherukuri et al. | 709/232 |
| 5,608,733 A | 3/1997 | Vallee et al. | |
| 5,703,870 A * | 12/1997 | Murase | 370/232 |
| 5,751,969 A * | 5/1998 | Kapoor | 709/235 |
| 5,831,973 A * | 11/1998 | Yokotani et al. | 370/236 |

(Continued)

FOREIGN PATENT DOCUMENTS

EP 0374928 6/1990

(Continued)

OTHER PUBLICATIONS

The ATM Forum, "ATM User-Network Interface Specification, Version 3.0," pp. i-xxxi, 1-654 (Sep. 10, 1993).

(Continued)

*Primary Examiner* — Gregory Todd
(74) *Attorney, Agent, or Firm* — Schwegman, Lundberg & Woessner, P.A.

(57) ABSTRACT

A method and apparatus are described for managing congestion in a network. For a receiving node, a congestion status associated with a node in the network is determined. The congestion status is advertised to at least one other node in the network. For a sending node, a congestion status associated with a receiving node in the network is received. The congestion status corresponds to a measured node condition at the receiving node. A call is routed to the receiving node based on the received congestion status.

10 Claims, 5 Drawing Sheets

U.S. PATENT DOCUMENTS

| | | | |
|---|---|---|---|
| 5,835,484 A * | 11/1998 | Yamato et al. | 370/230 |
| 5,898,691 A | 4/1999 | Liu | |
| 5,912,879 A * | 6/1999 | Cha et al. | 370/229 |
| 5,970,048 A * | 10/1999 | Pajuvirta et al. | 370/230 |
| 5,999,514 A | 12/1999 | Kato | |
| 5,999,532 A | 12/1999 | Terasaki | |
| 6,002,670 A | 12/1999 | Rahman et al. | |
| 6,018,519 A | 1/2000 | Ginzboorg | |
| 6,032,188 A * | 2/2000 | Mairs et al. | 709/234 |
| 6,169,727 B1 * | 1/2001 | Song | 370/235 |
| 6,192,422 B1 * | 2/2001 | Daines et al. | 710/29 |
| 6,201,810 B1 * | 3/2001 | Masuda et al. | 370/395.32 |
| 6,252,870 B1 | 6/2001 | Fraas et al. | |
| 6,275,493 B1 | 8/2001 | Morris et al. | |
| 6,282,197 B1 | 8/2001 | Takahashi et al. | |
| 6,356,629 B1 | 3/2002 | Fourie et al. | |
| 6,366,582 B1 | 4/2002 | Nishikado et al. | |
| 6,389,022 B1 | 5/2002 | Jeong et al. | |
| 6,424,620 B1 * | 7/2002 | Nishihara | 370/229 |
| 6,427,161 B1 | 7/2002 | LiVecchi | |
| 6,434,152 B1 | 8/2002 | Yamamura | |
| 6,442,140 B1 * | 8/2002 | Kirschenbaum | 370/236.1 |
| 6,456,600 B1 * | 9/2002 | Rochberger et al. | 370/255 |
| 6,463,476 B1 * | 10/2002 | Milles | 709/235 |
| 6,477,143 B1 * | 11/2002 | Ginossar | 370/230 |
| 6,560,654 B1 * | 5/2003 | Fedyk et al. | 709/239 |
| 6,563,809 B1 * | 5/2003 | Proctor et al. | 370/335 |
| 6,563,835 B1 | 5/2003 | Chen | |
| 6,614,762 B1 * | 9/2003 | Illiadis et al. | 370/252 |
| 6,615,264 B1 | 9/2003 | Stoltz et al. | |
| 6,625,121 B1 | 9/2003 | Lau et al. | |
| 6,690,653 B1 * | 2/2004 | Anbiah et al. | 370/256 |
| 6,725,378 B1 | 4/2004 | Schuba et al. | |
| 6,967,924 B1 * | 11/2005 | Aimoto | 370/235 |
| 6,977,899 B1 * | 12/2005 | Matragi et al. | 370/237 |
| 7,180,863 B1 * | 2/2007 | Bauer et al. | 370/237 |
| 7,298,753 B1 | 11/2007 | Dhar et al. | |
| 7,415,025 B1 | 8/2008 | Venkataraman et al. | |

FOREIGN PATENT DOCUMENTS

| | | |
|---|---|---|
| WO | WO 93/20637 A1 | 10/1993 |
| WO | WO 95/01076 | 1/1995 |
| WO | WO 00/47011 A1 | 8/2000 |

OTHER PUBLICATIONS

The ATM Forum, "ATM User-Network Interface, Version 3.1 (UNI 3.1) Specification," Draft of May 28, 1994.

Osama Aaboul-Magd, et al., "Flow and Congestion Control for Broadband Packet Networks," Teletraffic and Datatraffic in a Period of Change, ITC-13, Copenhagen, Denmark, pp. 853-858 (Jun. 19-26, 1991).

K.K. Ramakrishnan and Raj Jain, "A Binary Feedback Scheme for Congestion Avoidance in Computer Networks," ACM Transactions on Computer Systems, vol. 8, No. 2, pp. 158-181 (May 1990).

Alexander Gersht and Kyoo J. Lee, "A Congestion Control Framework for ATM Networks," IEEE Journal on Selected Areas in Communications, vol. 9, No. 7, pp. 1119-1130 (Sep. 9, 1991).

Raj Jain and K.K. Ramakrishnan, "Congestion Avoidance in Computer Networks with a Connectionless Network Layer: Concepts, Goals and Methodology," Computer Networking Symposium, pp. 134-143 (Apr. 1988).

C. Anthony Cooper and Kun I. Park, "Toward a Broadband Congestion Control Strategy," IEEE Network Magazine, pp. 18-23 (May 1990).

K. Bala, I. Cidon, and K. Sohraby, "Congestion Control for High Speed Packet Switched Networks," IEEE, pp. 520-526 (1990).

The IPX Product Family System Description, StrataCom, Inc., pp. 1-114 (1990).

* cited by examiner

MANAGING NETWORK CONGESTION USING DYNAMICALLY ADVERTISED CONGESTION STATUS

FIELD OF THE INVENTION

This invention relates to computer networks. In particular, the invention relates to congestion management.

THE BACKGROUND OF THE INVENTION

Traffic congestion in a network causes many problems including disruption of services, delayed transmission, and system outage. The congestion may occur when a particular node in the network becomes saturated or overloaded with connections and service calls.

A network node may be come congested for a number of reasons. First, a flood of packets may transit through the node during some peak hours due to high demand, causing congestion. Second, the node may have resource problems such as memory capacity, bandwidth unavailability. Third, the node may undergo some maintenance mode switchover where resumption of calls would take longer that the stipulated outage time.

One technique to address the congestion problem is to drop or reject new call requests. This technique imposes a burden on the already congested node to execute a task to process the calls before rejecting them. Consequently, there are numerous crankbacks in the network, resulting in degraded performance and loss of revenue for the carrier. For service-oriented applications such as high availability applications, this congestion is undesirable.

SUMMARY OF THE INVENTION

A method and apparatus are described for managing congestion in a network. For a receiving node, a congestion status associated with a node in the network is determined. The congestion status is advertised to at least one other node in the network. For a sending node, a congestion status associated with a receiving node in the network is received. The congestion status corresponds to a measured node condition at the receiving node. A call is routed to the receiving node based on the received congestion status.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

A method and apparatus are described for managing congestion in a network. For a receiving node, a congestion status associated with a node in the network is determined. The congestion status is advertised to at least one other node in the network. For a sending node, a congestion status associated with a receiving node in the network is received. The congestion status corresponds to a measured node condition at the receiving node. A call is routed to the receiving node based on the received congestion status.

The receiving node may be a transit node or a terminating node. The node may be a logical node which corresponds to a peer group of nodes in a hierarchical network. The call is routed to the node if the node is a terminating node or if the node is a transit node and the congestion status indicates that the node is not congested.

The advantages of the present invention include reducing network congestion, allowing the network to dynamically adapt to the changing conditions, reducing the outage of the call service, minimizing impact on users and support personnel, increasing revenue for the carrier, balancing traffic patterns, and eliminating traffic bottlenecks in the network.

In the following, the description refers to the Asynchronous Transfer Mode (ATM) model and the Peripheral Component Interconnect (PCI) bus as an interface example. It is contemplated that the technique is applicable to other models, buses, or network architectures with similar characteristics.

Figure 1:
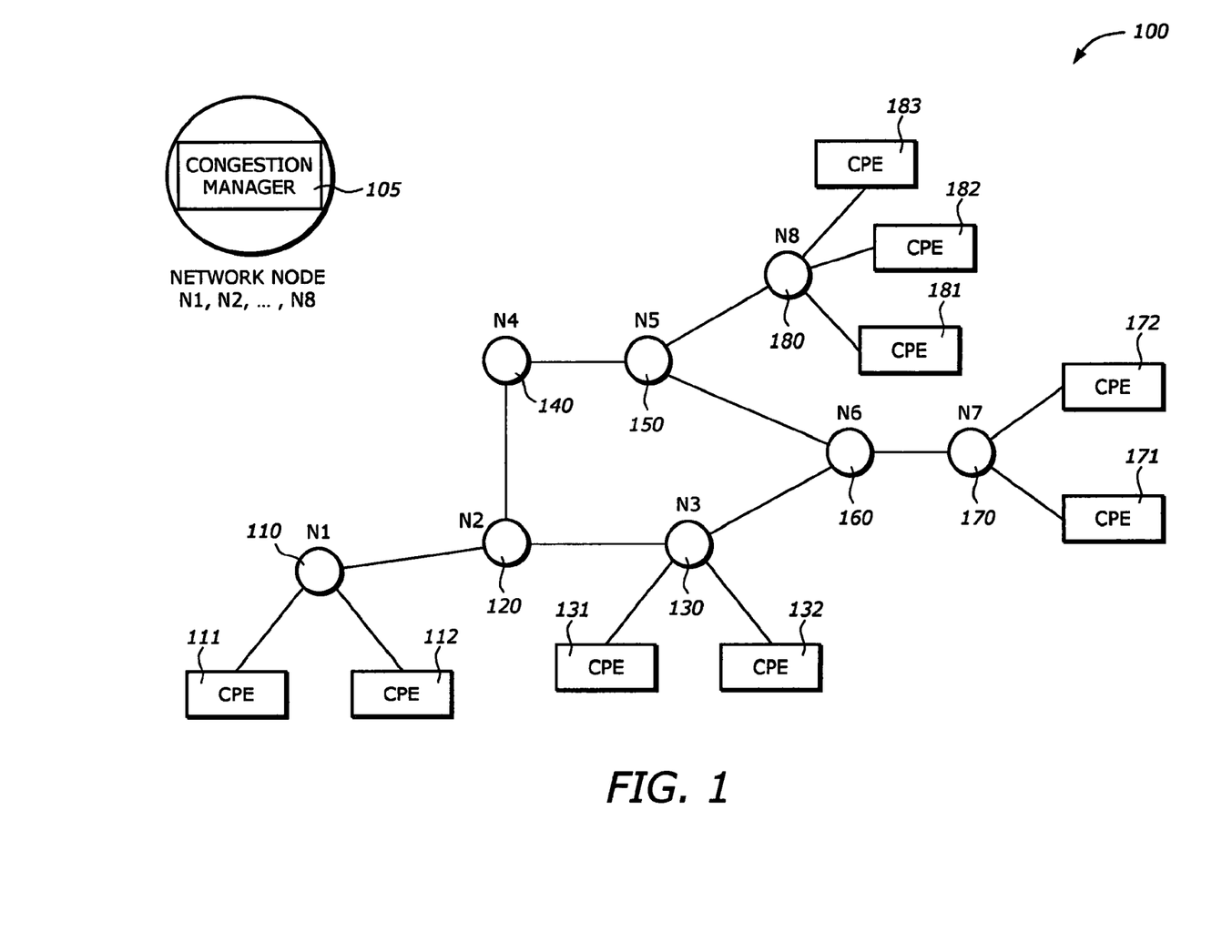
FIG. 1 shows a single peer system in which one embodiment of the invention can be practiced.

FIG. 1 shows a single peer system 100 in which one embodiment of the invention can be practiced. The system 100 includes nodes N1 110, N2 120, N3 130, N4 140, N5 150, N6 160, N7 170, N8 180, customer premises equipment (CPE) 111, 112, 131, 132, 171, 172, 181, 182, and 183. The single peer system 100 represents a network in which nodes are interconnected at the same hierarchical level and form a group. In one embodiment, the network is an ATM network having an interconnection model of the private network-to-network interface (PNNI).

Each of the nodes N1 110, N2 120, N3 130, N4 140, N5 150, N6 160, N7 170, and N8 180 is an ATM switch that performs switching and routing functions. A connection is made when a node requests a switched virtual circuit (SVC/SPVC) call. Messages are sent and forwarded from one node to another via established connection links. For example, node N1 110 is connected to nodes N2 120 and CPE's 111 and 112; node N6 160 is connected to nodes N3 130, N5 150, and N7 170. Each of the nodes N1 110, N2 120, N3 130, N4 140, N5 150, N6 160, N7 170, and N8 180 is capable of measuring its own operational conditions such as traffic flow status, resource availability, maintenance status, etc. The measurement can be performed by any method suitable for the nodes. This is typically done locally at each ATM switch or network node. For example, the measurement can be performed using inter-switch network information or Service Specific Connection Oriented Protocol (SSCOP) L3 as specified in the ATM UNI 3.1 and 3.0. The measured conditions are used to indicate a congestion status which indicates whether or not a node has become congested. This congestion status can be broadcast or advertised to other nodes within the network. The broadcasting or advertising of the congestion status can be performed by setting a transit flag in the node. This transit flag is accessible to other nodes. In one embodiment, the transit flag is one of a topology state parameter in a PNNI system. The topology state parameter is part of a PNNI topology state element (PTSE) which is transmitted in a PNNI topology state packet (PTSP). The PTSE is routing information that is flooded in a peer group. The PTSP contains one PTSE. The topology state parameters include metrics and attributes. Examples of the metrics are maximum cell transfer delay (MCTD), maximum cell delay variation (MCDV), maximum cell loss ratio (MCLR), and administrative weight.

Examples of attributes are available cell rate (ACR), cell rate margin (CRM), variation factor (VF), branching flag, and restricted transit flag.

Each of the nodes N1 110, N2 120, N3 130, N4 140, N5 150, N6 160, N7 170, and N8 180 may be connected to a CPE such as a workstation, a computer system, or a peripheral device. As illustrated in FIG. 1, node N1 is connected to CPE 111 and 112, node N3 130 is connected to CPE 131 and 132, node N7 is connected to CPE 171 and 172, and node N8 180 is connected to CPE 181, 182, and 183.

A node may be a transit node or a terminating node. A transit node is one through which a message is routed but is not a final destination. A terminating node is a destination node and is connected to at least one CPE. Each of the nodes has a congestion manager 105 to manage congestion at the node. The topology shown in FIG. 1 is for illustrative purposes only. Other network topologies and/or configurations are possible. Each of the ATM switches or nodes N1 110, N2 120, N3 130, N4 140, N5 150, N6 160, N7 170, and N8 180 is configured to have a congestion manager 105.

Figure 2:
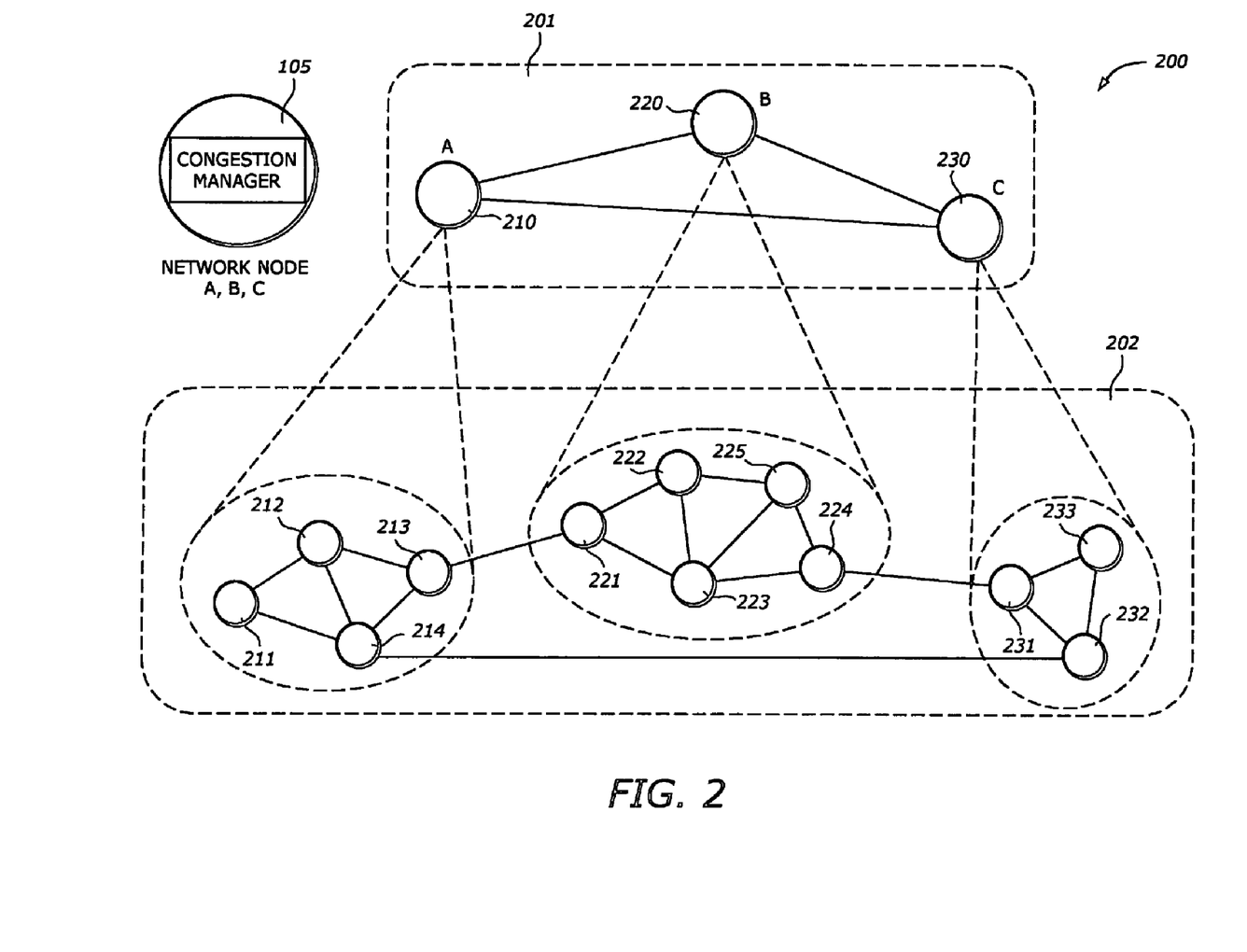
FIG. 2 shows a hierarchical system in which one embodiment of the invention can be practiced.

FIG. 2 shows a hierarchical system 200 in which one embodiment of the invention can be practiced. The hierarchical system 200 includes two hierarchical levels 201 and 202. The level 201 includes logical nodes A 210, B 220, and C 230. The level 202 includes nodes 211, 212, 213, 214, 221, 222, 223, 224, 225, 231, 232, and 233. The congestion management for the hierarchical system 200 is essentially similar to that of the peer group shown in FIG. 1 except that the management is performed at the logical level.

Each of the logical nodes A 210, B 220, and C 230 corresponds to a peer group at the next lower level, i.e., level 202. The logical node A 210 corresponds to a peer group including nodes 211, 212, 213, and 214. The logical node B 220 corresponds to a peer group including nodes 221, 222, 223, 224, and 225. The logical node C 230 corresponds to a peer group including nodes 231, 232, and 233. A logical node acts on the behalf of its child peer group. Each of the logical nodes A 210, B 220, and C 230 has a congestion manager 105 to manage congestion at the corresponding peer group.

In a hierarchical system, SVC/SPVC connections can cross multiple peer groups. For example, a SVC/SPVC connection may go from the logical node A 210 to the logical node C 230 passing through the logical node B 220. Each of the logical nodes represents its corresponding child peer group and manages the congestion of the peer group. For example, if the traffic condition at the peer group B 220 which includes nodes 221, 222, 223, 224, and 225, becomes congested, the parent logical node B220 advertises the congestion status to other logical nodes by setting its transit flag. The transit flag of each logical node is accessible to other logical nodes. In one embodiment, the transit flag is one of a topology state parameter in a PNNI system. The topology state parameter is part of a PNNI topology state element (PTSE) which is transmitted in a PNNI topology state packet (PTSP).

Other peer groups receive the congestion status of the logical node B 220 and avoid routing SVC/SPVC calls traversing the peer group of the logical node B 220. The congestion at the peer group B 220 is therefore reduced.

Figure 3:
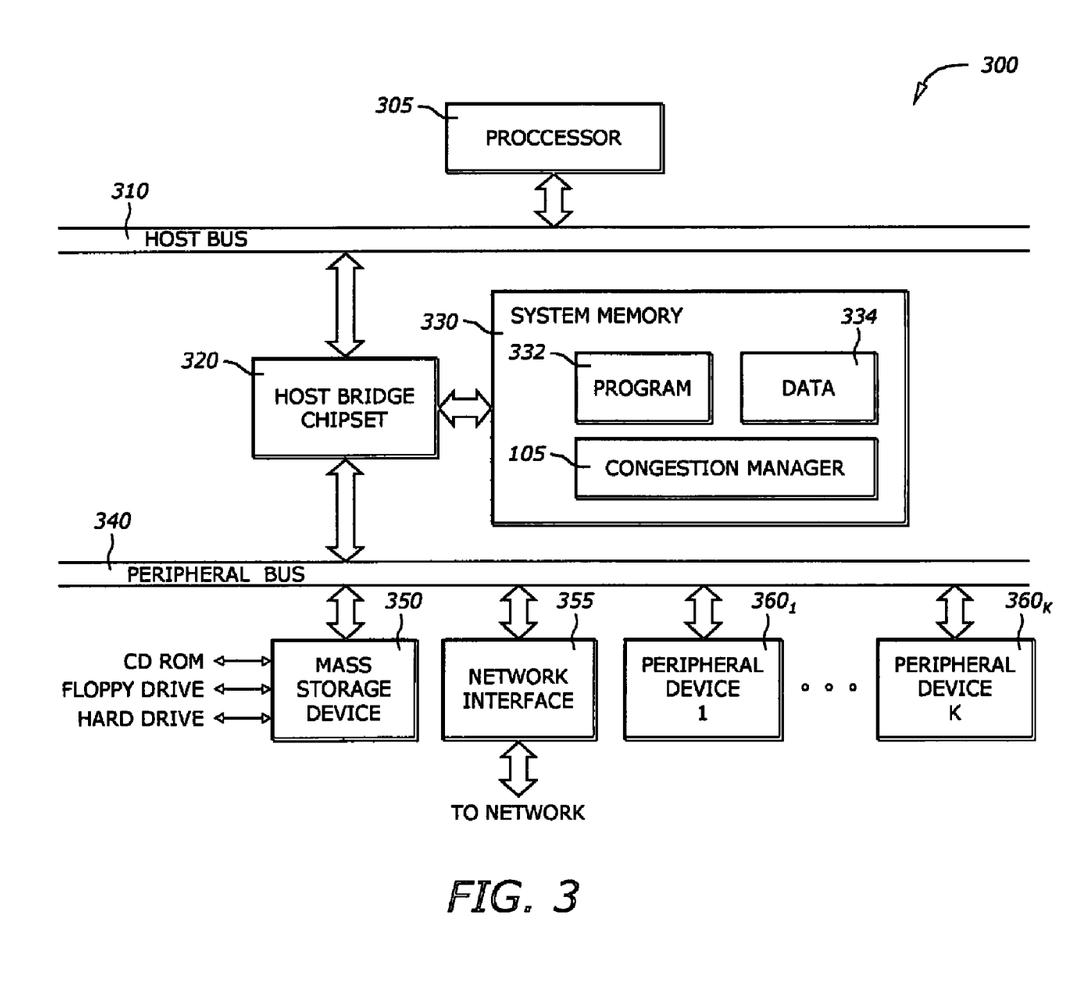
FIG. 3 shows a computer system for the congestion management.

FIG. 3 shows a computer system 300 for the congestion management. The computer system 300 may be used as part of an ATM switch, a host machine, a workstation, a local area network (LAN), and any other system or subsystem connected to the network. The computer system 300 includes a processor 305, a host bus 310, a host bridge chipset 320, a system memory 330, a peripheral bus 340, a mass storage device 350, a network interface device 355, and K peripheral devices $360_1$ to $360_K$.

The processor 305 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 320 includes a number of interface circuits to allow the host processor 305 access to the system memory 330 and the peripheral bus 340. The host bridge chipset 320 may include a memory controller, a bus interface circuit, and an I/O controller. The memory controller provides an interface to the system memory 330. The I/O controller provides control of I/O functions.

The system memory 330 represents one or more mechanisms for storing information. For example, the system memory 330 may include non-volatile or volatile memories. Examples of these memories include flash memory, read only memory (ROM), or random access memory (RAM). The system memory 330 contains a program 332, a data storage 334, and the congestion manager 105 as shown in FIG. 1 and FIG. 2. Of course, the system memory 330 preferably contains additional software (not shown), which is not necessary to understanding the invention.

The peripheral bus 360 provides bus interface to the mass storage device 350, the network interface 355, and the peripheral devices $360_1$ to $360_K$. In one embodiment, the peripheral bus 360 is the peripheral component interconnect (PCI) bus.

The mass storage device 350 include CD ROM, floppy diskettes, and hard drives. The mass storage device 350 stores non-volatile information such as programs or data. The mass storage device 350 provides a mechanism to read machine-readable media. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The network interface device 355 provides an interface to a network such as ATM, LAN, WAN, etc. The peripheral devices $360_1$ to $360_K$ may include an audio device, a multimedia device, a modem, a printer controller, etc.

Figure 4:
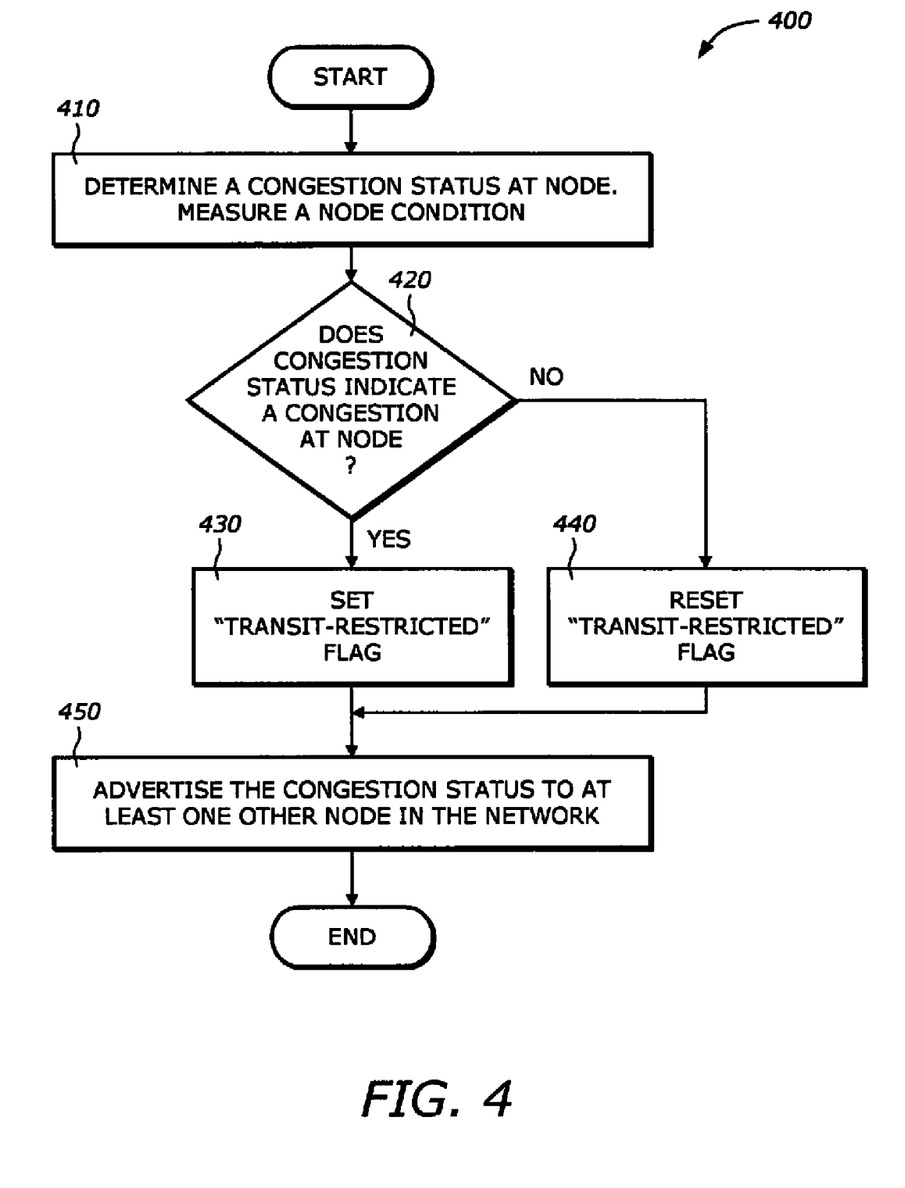
FIG. 4 shows a flowchart for a process to advertise the congestion status.

FIG. 4 shows a flowchart for a process 400 to advertise the congestion status. The process 400 is used for a receiving node. The node may be a physical node or a logical node. A logical node acts on the behalf of its child peer group as described in FIG. 2.

Upon START, the process 400 determines a congestion status at the node (Block 410). This determination can be performed by measuring a node condition. The node condition may include a traffic condition, resource availability such as memory or processor, and maintenance status. Then, the process 400 determines if the congestion status indicates a congestion at the node (Block 420). If there is not congestion, the process 400 resets a "transit restricted" flag indicating that the node is not restricted for transit (Block 440). This transit flag is accessible to other nodes in the network. If there is a congestion, the process 400 sets a "transit-restricted" flag to indicate that all calls through the node should be avoided unless the node is a terminating node (Block 430).

Next, the process 400 advertises the congestion status by making the flag available for access to at least one other physical or logical node in the network (Block 450). Then, the process 400 is terminated.

Figure 5:
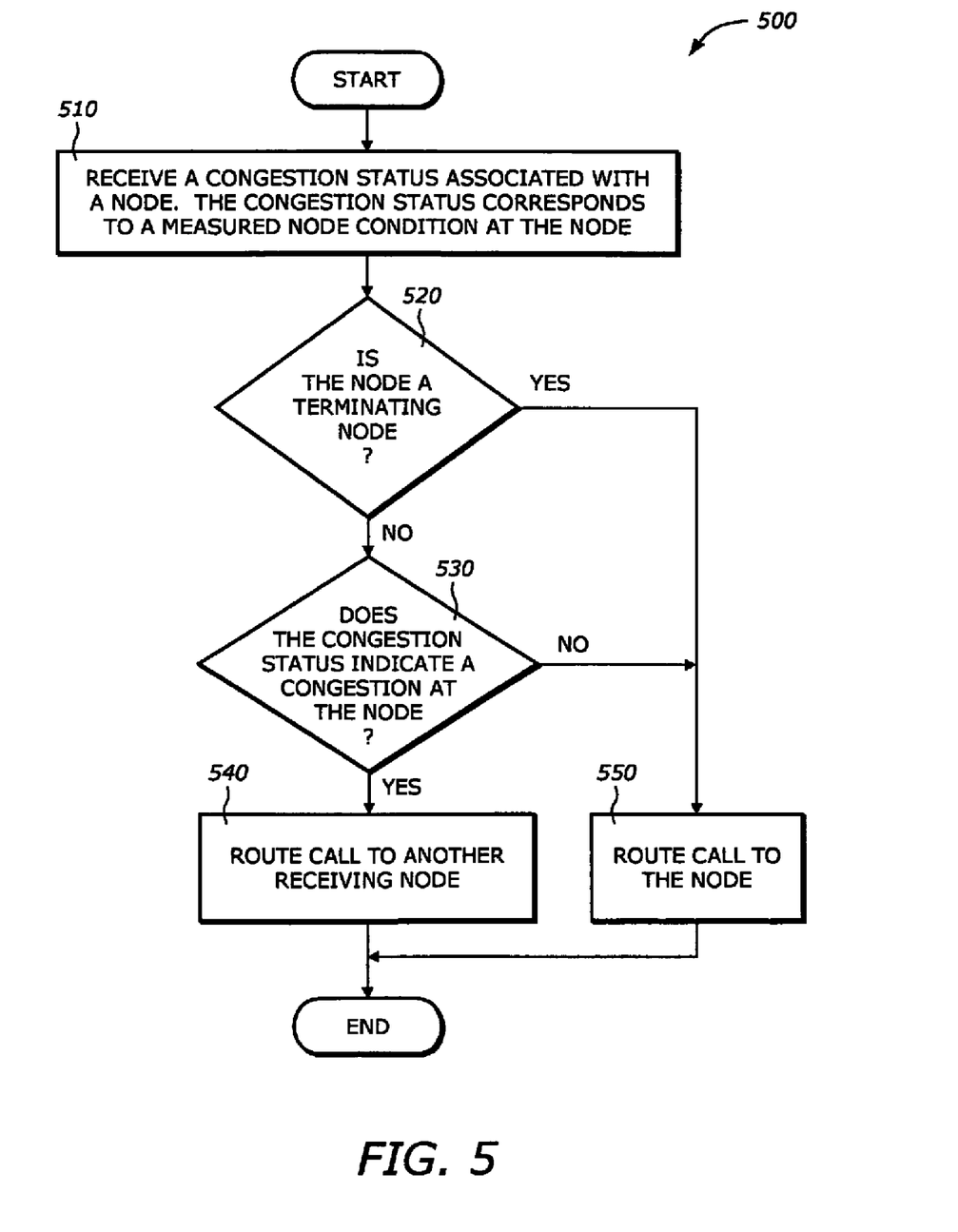
FIG. 5 shows a flowchart for a process to respond to the advertised congestion status.

FIG. 5 shows a flowchart for a process 500 to respond to the advertised congestion status. The process 500 is used for a sending node. The node may be a physical node or a logical node. A logical node acts on the behalf of its child peer group as described in FIG. 2.

Upon START, the process 500 receives a congestion status associated with a receiving node (Block 510). This congestion status corresponds to a measured node condition at the receiving node. Typically, the receiving of the congestion status is performed by accessing a transit flag of the receiving node. Then, the process 500 determines if the node is a termination node (Block 520). If the receiving node is a terminating node, the process 500 routes the SVC/SPVC call to the node (Block 550). The process 500 is then terminated.

If the receiving node is not a terminating node, the process 500 determines if the congestion status indicates that there is a congestion at the node (Block 530). If there is no congestion, the process 500 goes to block 550. If there is a congestion, the process 500 routes the SVC/SPVC call to another receiving node. Then the process 500 is terminated.

A technique has been described to manage congestion in a network. For a receiving node, a congestion status associated with a node in the network is determined. The congestion status is advertised to at least one other node in the network. For a sending node, a congestion status associated with a receiving node in the network is received. The congestion status corresponds to a measured node condition at the receiving node. A call is routed to the receiving node based on the received congestion status.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to manage congestion in a network, the method comprising:
   determining a congestion status associated with a node in a single peer group or a hierarchical level in the network, the congestion status being represented by a transit flag accessible to at least one other node in the single peer group or the hierarchical level to determine if a call is routed through the node; and
   broadcasting the congestion status from the node to the at least one other node in the single peer group or the hierarchical level,
   wherein determining the congestion status comprises:
   setting the transit flag, if the congestion status indicates a congestion, to indicate that a call through the node is avoided unless the node is a terminating node; and
   resetting the transit flag, if the congestion status does not indicate a congestion, to indicate that the node is not restricted for transit.

2. The method of claim 1 wherein the node is a private network-to-network interface (PNNI) node.

3. The method of claim 2 wherein the transit flag is a PNNI topology state parameter.

4. A computer program product comprising:
   a non-transitory computer usable medium having computer program code embodied therein for managing congestion in a network, the computer program product having:
   computer readable program code for determining a congestion status associated with a node in a single peer group or a hierarchical level in the network, the congestion status being represented by a transit flag accessible to at least one other node in the single peer group or the hierarchical level to determine if a call is routed through the node; and
   computer readable program code for broadcasting the congestion status from the node to the at least one other node in the single peer group or the hierarchical level,
   wherein the computer readable program code for determining the congestion status comprises:
   computer readable program code for setting the transit flag, if the congestion status indicates a congestion, to indicate that a call through the node is avoided unless the node is a terminating node; and
   computer readable program code for resetting the transit flag, if the congestion status does not indicate a congestion, to indicate that the node is not restricted for transit.

5. The computer program product of claim 4 wherein the node is a private network-to-network interface (PNNI) node.

6. The computer program product of claim 5 wherein the transit flag is a PNNI topology state parameter.

7. A system interfacing to a network comprising:
   a processor coupled to the network; and
   a memory coupled to the processor, the memory containing program code for managing congestion in the network, the program code when executed causing the processor to:
   determine a congestion status associated with a node in a single peer group or a hierarchical level in the network, the congestion status being represented by a transit flag accessible to at least one other node in the single peer group or the hierarchical level to determine if a call is routed through the node; and
   broadcast the congestion status from the node to the at least one other node in the single peer group or the hierarchical level,
   wherein the program code causing the processor to determine the congestion status causes the processor to:
   set the transit flag, if the congestion status indicates a congestion, to indicate that a call through the node is avoided unless the node is a terminating node; and
   reset the transit flag, if the congestion status does not indicate a congestion, to indicate that the node is not restricted for transit.

8. An apparatus to manage congestion in a network comprising:
   means for determining a congestion status associated with a node in a single peer group or a hierarchical level in the network, the congestion status being represented by a transit flag accessible to at least one other node in the single peer group or the hierarchical level to determine if a call is routed through the node; and
   means for broadcasting the congestion status from the node to the at least one other node in the single peer group or the hierarchical level,
   wherein the means for determining the congestion status comprises:

means for setting the transit flag, if the congestion status indicates a congestion, to indicate that a call through the node is avoided unless the node is a terminating node; and means for resetting the transit flag, if the congestion status does not indicate a congestion, to indicate that the node is not restricted for transit.

9. The apparatus of claim 8 wherein the node is a private network-to-network interface (PNNI) node.

10. The apparatus of claim 9 wherein the transit flag is a PNNI topology state parameter.

* * * * *